United States Patent [19]

Tanaka

[11] Patent Number: 4,757,720
[45] Date of Patent: Jul. 19, 1988

[54] KARMAN VORTEX FLOWMETER
[75] Inventor: Akira Tanaka, Saitama, Japan
[73] Assignee: Honda Giken Kogyo Kabushiki Kaisha, Tokyo, Japan
[21] Appl. No.: 40,555
[22] Filed: Apr. 17, 1987
[30] Foreign Application Priority Data Apr. 18, 1986 [JP] Japan .................................. 61-90697

[51] Int. Cl.4 ............................................. G01F 1/32
[52] U.S. Cl. .................................. 73/861.24; 73/658
[58] Field of Search ................ 73/652, 651, 654, 658, 73/650, 861.24

[56] References Cited
U.S. PATENT DOCUMENTS 1,935,445  11/1933  Heinz ............................... 73/861.24
3,116,639  1/1964  Bird .................................. 73/861.24
4,470,310  9/1984  Tsuruoka et al. ................ 73/861.24

Primary Examiner—Herbert Goldstein
Attorney, Agent, or Firm—Lyon & Lyon

[57] ABSTRACT

A Karman vortex flowmeter for producing a Karman vortex street corresponding to the velocity of a fluid and measuring the flow rate of the fluid by making use of the variations in the pressure caused by the production of the Karman vortex street to cause vibration of a vibrating plate portion of a metal sheet member consisting of a magnetic substance and having first and second magnetic circuit-forming portions to produce a magnetic circuit whose magnetic flux reverses in direction whenever the direction of the vibration of the vibrating plate portion is reversed. Magnets are disposed to magnetize the ends of the vibrating plate portion to different polarities according to the direction of the vibration of the vibrating plate portion and a detecting means detects the inversion of the direction of the magnetic flux caused by the formation of the magnetic circuit and the frequency of flux inversion is used to determine the flow rate of the fluid.

10 Claims, 5 Drawing Sheets

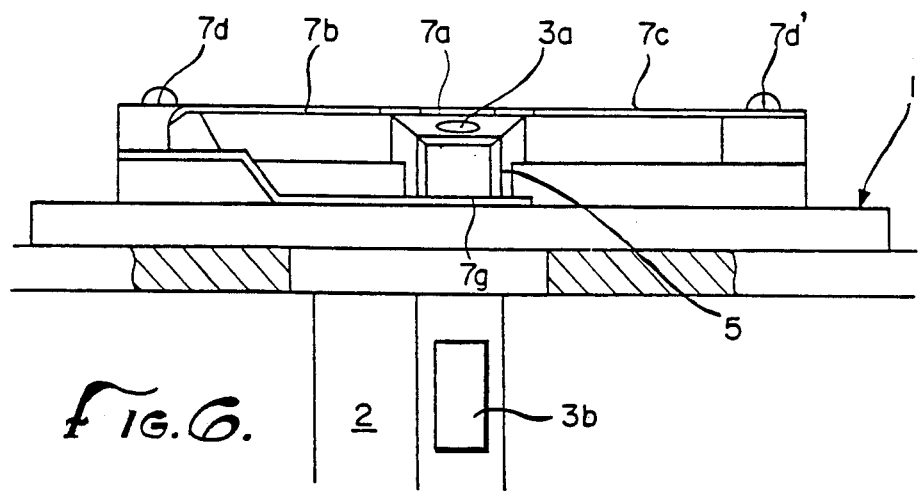
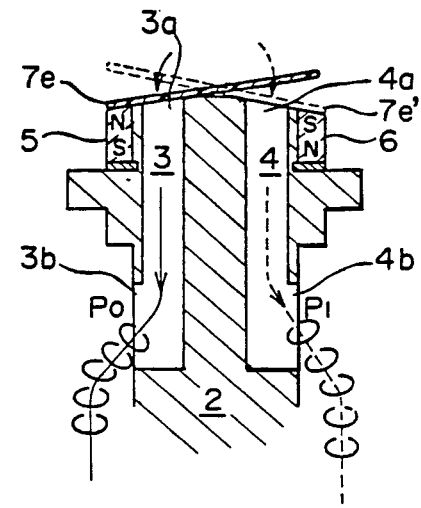
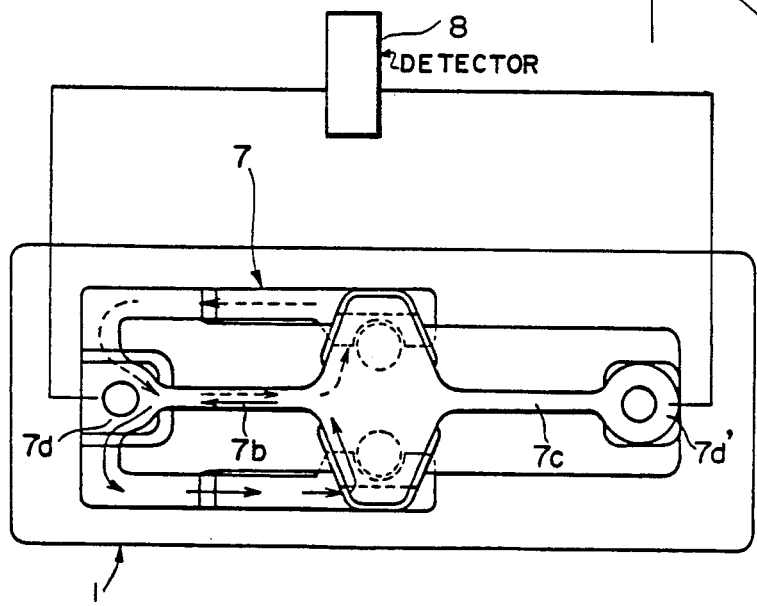

KARMAN VORTEX FLOWMETER

The present invention relates to a flow meter for measuring the flow rate of a fluid such as air and, more particularly, to a flowmeter for measuring the flow rate of a fluid according to the manner in which a Karman vortex street is produced by a column inserted in a fluid communication passage.

A generally known instrument for measuring the flow rate of a fluid such as air is a flowmeter having a communication passage in which a column is inserted to generate vortices. A Karman vortex street is produced on the downstream side of the column at a frequency corresponding to the flow velocity. The interval at which the vortices are produced or the frequency is detected to determine the flow rate.

In the conventional flowmeter utilizing a Karman vortex street, the variations in the pressure which are caused by two rows of vortices produced alternately from opposite sides of the column are transmitted to a vibrating plate. The vibration of the plate is optically detected. That is, the interval at which the vortices are generated or the frequency is measured by sensing the reflection of the light projected onto the vibrating plate. In this optical flowmeter configuration, dust or powder contained in the fluid adheres to the vibrating plate. Accordingly, the reflectivity of light varies with time and also the flowmeter is affected by external disturbing light. Thus, the ability of the flowmeter to detect flow rate deteriorates.

The present invention has been made to solve these problems. It is the object of the invention to provide a flowmeter which can detect flow rate accurately, is simple in structure, and whose ability to detect flow rate does not deteriorate in spite of the passage of time.

The above object is achieved in accordance with the teachings of the present invention by a Karman vortex flowmeter for producing a Karman vortex street corresponding to the velocity of a fluid on the downstream side of a column inserted in the fluid to produce the vortex street and for measuring the flow rate of the fluid by making use of the variations in the pressure caused by the production of the Karman vortex street, wherein a vibrating plate vibrates in response to the variations in the pressure and magnetic circuit-forming portions produce a magnetic circuit whose magnetic flux reverses in direction whenever the direction of the vibration of the vibrating plate is reversed and detecting means detects the inversion of the direction of the magnetic flux caused by the formation of the magnetic circuit to find the flow rate of the fluid.

A flowmeter according to the invention is hereinafter described in detail by referring to the drawings, wherein:

FIG. 6 is a partially cutaway elevation view taken in the direction indicated by the arrow VI in FIG. 5;

FIG. 8 is a cross-sectional view taken along the line VIIIVIII of FIG. 5, for illustrating the relationship of the variations in the pressure inside a hole in the flowmeter to the direction of vibration of the vibrating plate;

FIG. 9 is a view illustrating a magnetic circuit formed by magnetic circuit-forming portions of the magnetic sheet member;

Figure 1:
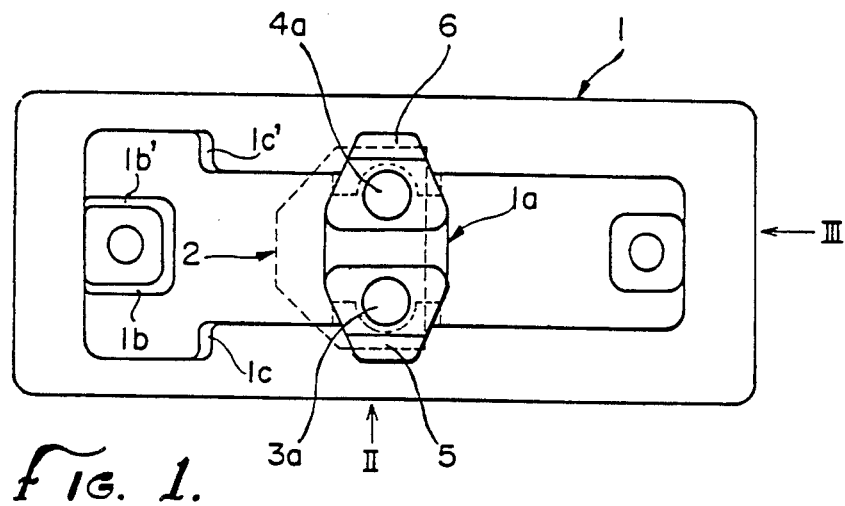
FIG. 1 is a plan vieew showing the shape of the fundamental structural body of a Karman vortex flowmeter according to the invention.
Figure 2:
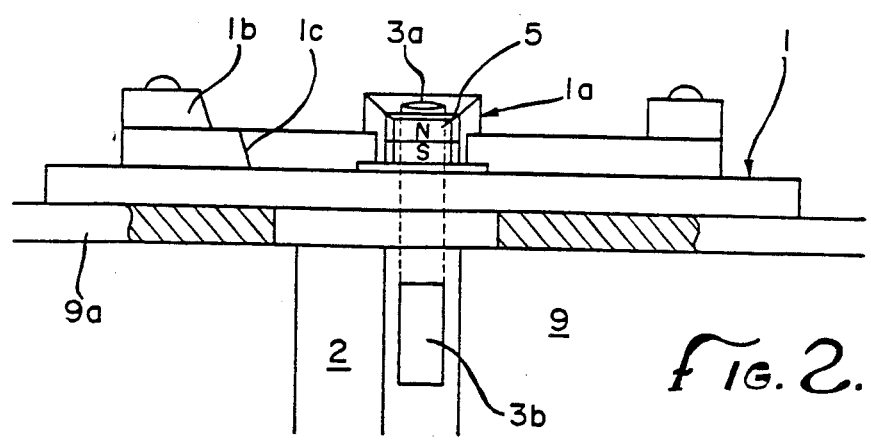
FIG. 2 is a partially cutaway elevation view taken in the direction indicated by the arrow II in FIG. 1.
Figure 3:
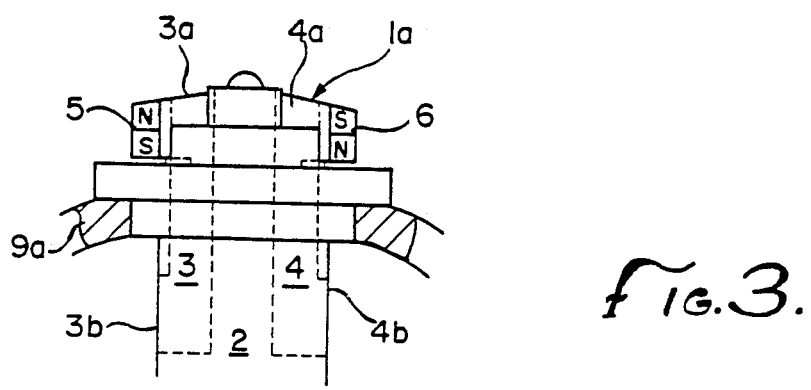
FIG. 3 is a partially cutaway elevation view taken in the direction indicated by the arrow III in FIG. 1.
Figure 4:
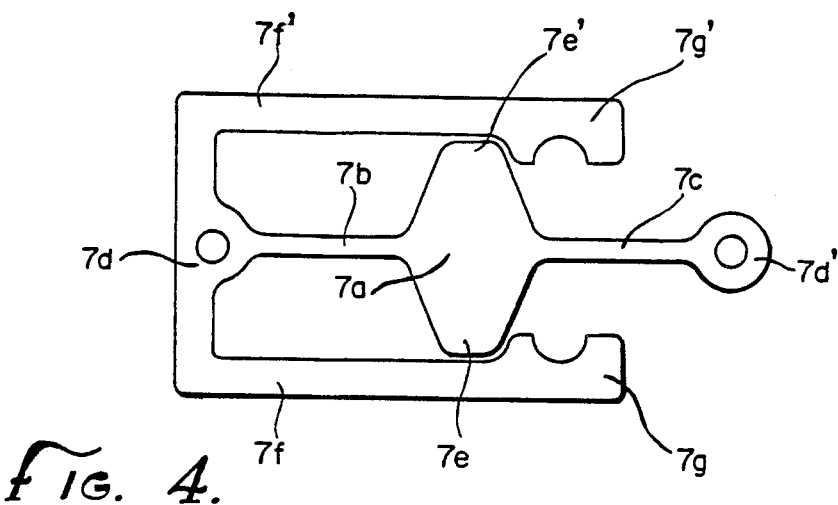
FIG. 4 is a plan view showing the shape of a metal sheet member mounted to the structural body shown in FIG. 1.

FIGS. 1–7 show the structure of a flowmeter according to the invention. Referring first to FIGS. 1-3, the flowmeter has a structural body 1 (hereinafter referred to as "the base") which is mounted to the wall surface 9a of a communication passage 9. A column 2 is inserted in the fluid flow within the passage 9 in a vertical relationship to the direction of the flow, and is firmly fixed to the base 1. Holes 3 and 4 extend through the base 1 and the column 2, and act as pressure-transmitting means which place the inside of the wall surface 9a of the passage 9 in communication with the outside. The holes 3 and 4 have open ends 3a and 4a, respectively, on the outside of the communication passage. These open ends 3a and 4a are located on the surface of a protruding portion 1a formed at the center of the base 1. The holes 3 and 4 have inner open ends 3b and 4b, respectively, which are located on opposite side surfaces of the column 2. Two magnets 5 and 6 are embedded in the outer portions of the protruding portion 1a adjacent the open ends 3a and 4a such that their polarities are opposite to each other. The magnets are made, for example, of ferrite.

FIGS. 4–7 show the shape of a metal sheet member 7, as well as the manner in which it is mounted to the base 2. The metal sheet member 7 consists of an amorphous metal sheet which serves as a member forming a magnetic circuit and also as a vibrating plate. More specifically, the sheet member 7 is cut into a substantially rectangular, annular form showing FIG. 4 out of a single thin strip of an amorphous metal by photoetching or other similar process. The member 7 has a substantially central vibrating plate portion 7a (hereinafter referred to as "the vibrating plate"), connecting portions 7b and 7c extending laterally from opposite sides of and support the plate 7a, mounting portions 7d and 7d' formed on opposite sides of the connecting portions 7b and 7c, outer portions 7f and 7f' that are symmetrical with respect to a center line, and sandwiched portions 7g and 7g' at the ends of the outer portions 7f and 7f'. The outer portions 7f and 7f' extend from the left mounting portion, first upwardly and downwardly, respectively, and then to the right in a parallel relation to the connecting portions 7b and 7c. The connecting portions 7b and 7c are narrow to allow a twisting effect as described later. The vibrating plate 7a, the connection portion 7b, the mounting portion 7d, the outer portion 7f, and the sandwiched portion 7g of the sheet member 7 form a first magnetic circuit. The vibrating plate 7a, the connecting portion 7b, the mounting portion 7d, the outer portion 7f, and the sandwiched portion 7g' form a second magnetic circuit.

Figure 5:
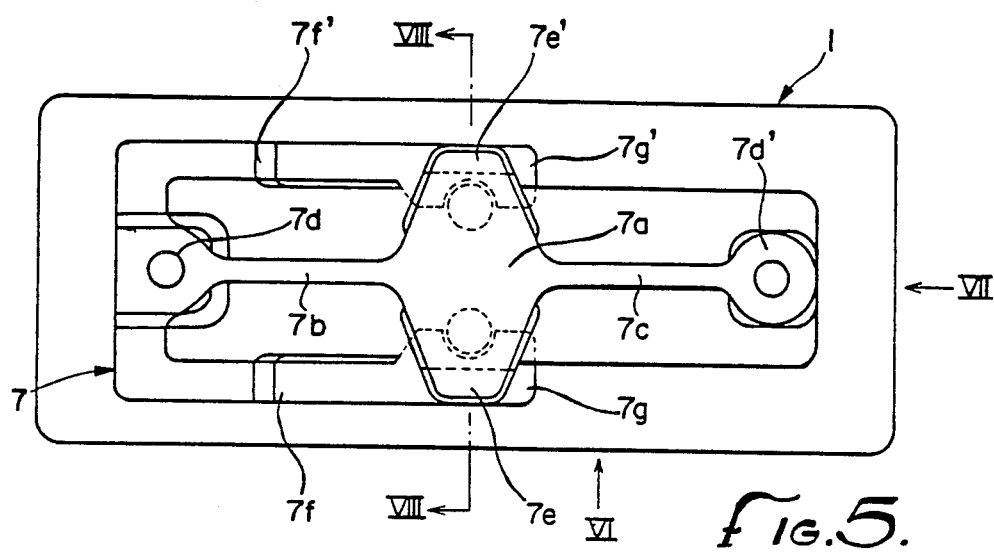
FIG. 5 is a plan view showing the manner in which the metal sheet member shown in FIG. 4 is mounted to the structural body.
Figure 7:
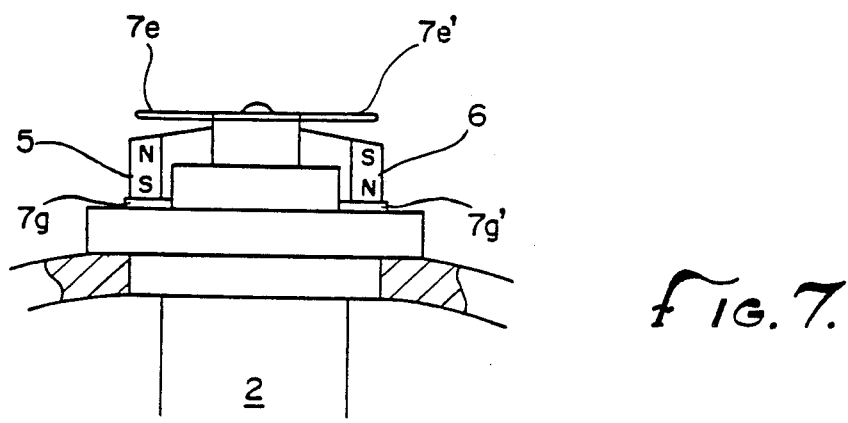
FIG. 7 is a partially cutaway elevation view taken in the direction indicated by the arrow VIII in FIG. 5.

The mounting portions 7d and 7d' of the metal sheet member 7 are rigidly fixed to a stationary portion of the base 1 to apply a certain tension to the vibrating plate 7a. As shown in FIGS. 1 and 2, the base 1 has steps 1b, 1c, 1b', and 1c'. The outer portions 7f and 7f' are bent along the steps 1b, 1c and the steps 1b', 1c', respectively, and attached to them. The sandwiched portions 7g and 7g' are mounted between the undersides of the magnets 5 and 6 and the upper surface of the base 1, the magnets 5 and 6 being rigidly fixed to the central protrusion 1a on the base 1 (FIGS. 5-7).

As shown in FIG. 8, when the vibrating plate 7a vibrates, its opposite ends 7e and 7e' incline alternately to close the open ends 3a and 4a, respectively, of the holes 3 and 4. The metal sheet member 7 is magnetized to an intensity corresponding to the inclination of the vibrating plate 7a, i.e., the distance between the end 7e or 7e' of the vibrating plate 7a and the magnet 5 or 6.

The operation of the instrument constructed as described above will now be described by referring to FIGS. 8 and 9. When the fluid within the communication passage 9 is at rest, the vibrating plate 7a is at rest in such a way that the plate 7a is parallel with the base 1 or that either the end 7e or 7e' is in contact with the corresponding magnet 5 or 6. In this state, the metal sheet member 7 is magnetized constantly. When a fluid flows through passage 9, Karman vortices are produced alternately from opposite sides of column 2 on the downstream side of column 2 according to the velocity of the flow. As a result, the pressures on opposite sides of the column 2 vary. The variations in the pressures are transmitted via the holes 3 and 4 to the vibrating plate 7a, which then begins to vibrate according to the flow velocity, or the generation of the Karman vortex street. When Karman vortices are produced, for example, to the left of the column 2 as viewed in FIG. 8, the pressure Po inside the hole 3 communicating with the left side of the passage 9 and the pressure P1 inside the hole 4 communicating with the right side have the relation P0<P1. The difference between the pressure P1 and the pressure P0 tilts the vibrating plate 7a in the direction indicated by the solid line arrow in FIG. 8. As a result, one end 7e of the plate 7a comes into contact with or close to the magnet 5, as indicated by the solid line in the figure. At this time, a magnetic field is set up in the metal sheet member 7 as indicated by the arrows of solid lines in FIG. 9. Next, the Karman vortices are generated to the right of the column 2. Then, the relation of the pressure P0 inside the left hole 3 to the pressure P1 inside the right hole 4 is given by P0>P1. This causes the vibrating plate 7a to incline in the direction indicated by the broken line arrow in FIG. 8. The other end 7e' of the vibrating plate 7a comes into contact with or close to the magnet 6 as indicated by the broken lines in the figure. As a result, a magnetic field (second magnetic field) is produced in the connecting portion 7b of the sheet member 7 in the direction indicated by the broken line arrows in FIG. 9, i.e., in the direction opposite to the direction indicated by the solid line arrows. Thereafter, the Karman vortices are produced alternately on opposite sides of the column 2. As a result, the ends 7e and 7e' of the vibrating plate 7a vibrate alternately up and down, reversing the direction of the magnetic field in the connecting portion 7b of the sheet member 7.

Figure 10:
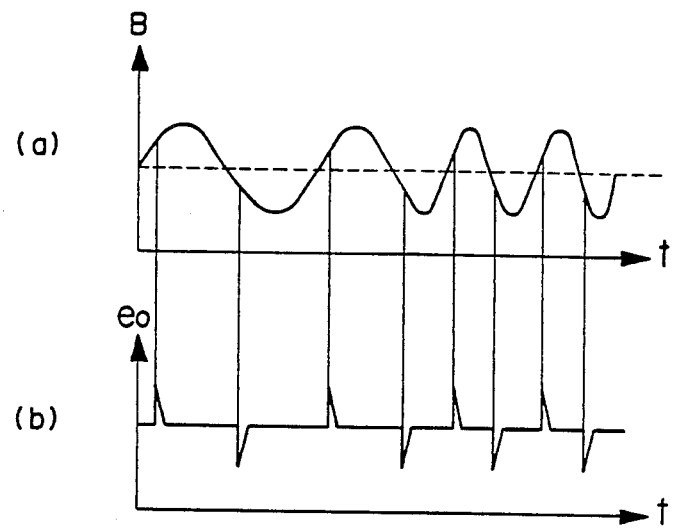
FIG. 10 is a timing chart showing variations in the intensity of the magnetic field in the metal sheet member and the generation of the voltage pulses.

The intensity of the magnetic field produced by the vertical vibration of the vibrating plate 7a increases as the distance between the end 7e or 7e' of the plate 7 and the magnet 5 or 6 is decreased. The intensity of the field is varied by the vibration of the plate 7a as shown by graph (a) in FIG. 10. Whenever the field intensity reaches a certain strength as shown by graph (b) in FIG. 10, a sharp voltage pulse e0 is produced between the mounting portions 7d and 7d' of the metal sheet member 7 by the large Barkhausen effect of the amorphous metal. This pulse e0 is made sharper by the Matteuci effect that is made conspicuous by the formation of tensile layers created in the left and right portions 7b, 7c of the sheet member 7 by the twisting due to the inclination of the vibrating plate 7a. In this way, sharp voltage pulses are always produced without using any detector coil, irrespective of the velocity of the fluid, i.e., the velocity of the vibration of the plate 7a caused by the generation of Karman vortices. Consequently, it is easy to detect pulses and to process the resultant signals. In this embodiment, the generation of the voltage pulse e0 is detected by a detector 8 connected to the support portions 7d and 7d', as shown in FIG. 9.

Figure 11:
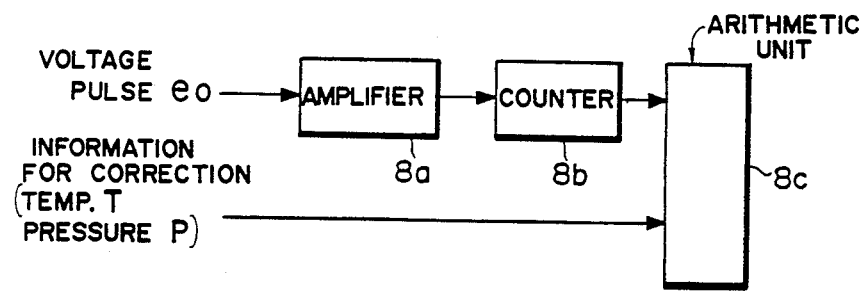
FIG. 11 is a block diagram showing a voltage-pulse detecting means.

In particular, as shown in FIG. 11, the detector 8 comprises an amplifier 8a, a counter 8b, and an arithmetic unit 8c consisting of a microcomputer. The detector 8 counts the number of voltage pulses e0, or the frequency f, produced during a certain period, and finds the fluid velocity v by substituting the obtained frequency f into the following formula:

$$v = d/\text{st} \times f$$

where d is the width of the column 2 for producing vortices and St is the Strouhal number.

The arithmetic unit 8c of the detector calculates the flow rate of the fluid from the fluid velocity v found in this way and also from other types of information commonly used for correction, for example, the temperature T and the pressure P of the fluid.

Figure 12:
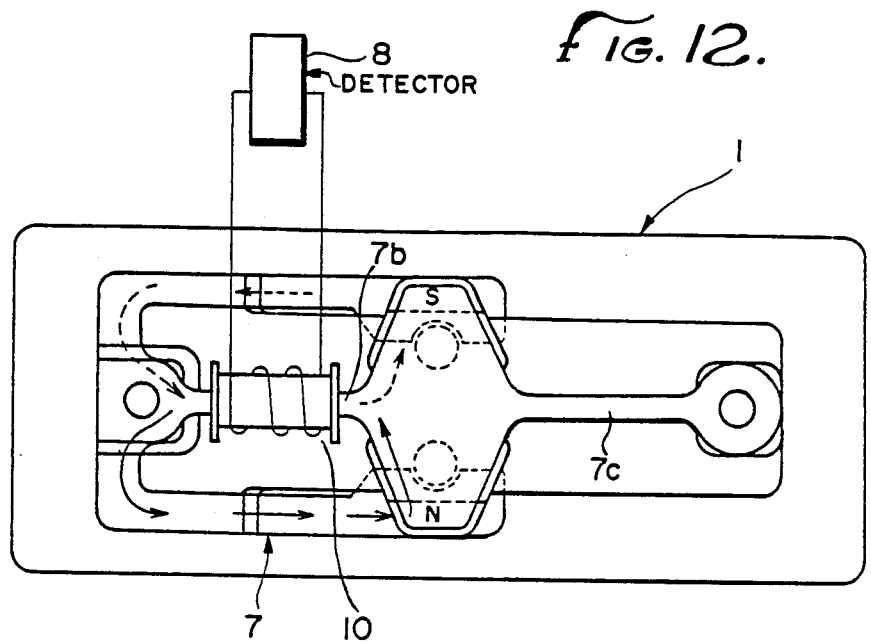
FIG. 12 is a plan view showing another embodiment wherein voltage pulses are detected by a detector coil.

In the present invention, tensile layers are formed in the left and right side portions 7b, 7c of the metal sheet member 7 by twists caused by inclination of the vibrating plate 7a to produce and detect sharp voltage pulses, in order to simplify the detector structure of the flowmeter. Alternatively, as shown in FIG. 12, a detector coil 10 may be wound around the connector portion 7b of the metal sheet member 7 to produce a large Barkhausen effect intrinsic in amorphous metal, reversing the direction of the magnetic field. The voltage pulse induced across the coil 10 may be detected.

Figure 13:
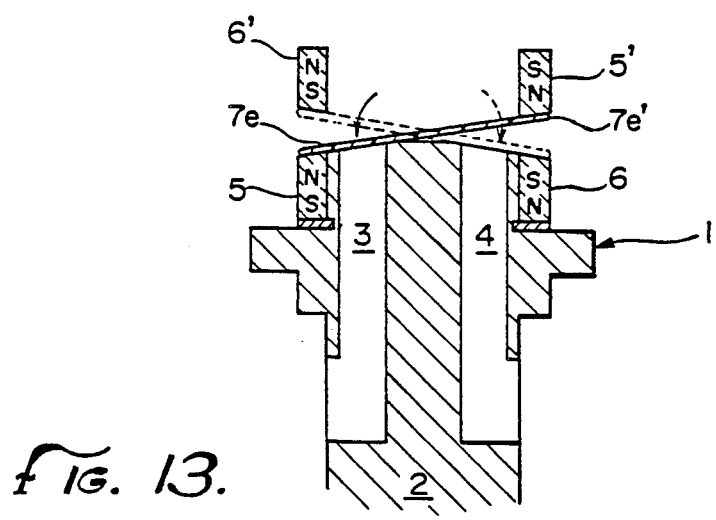
FIG. 13 is a cross-sectional view showing a further embodiment wherein the magnets are disposed in a different manner.

Also in the foregoing embodiment of the flowmeter, the magnets 5 and 6 are mounted only on the base 1. The present invention is not limited to this configuration. For example, as shown in FIG. 13, a second pair of magnets 5' and 6' may be disposed above the holes 3 and 4 in such a way that an appropriate stationary vibrating plate 7a is interposed between them and the first pair of magnets 5 and 6. The magnets 5' and 6' above both ends 7e and 7e' of the vibrating plate 7a alternately magnetize the plate.

In the preferred embodiment, the metal sheet member 7 is made from an amorphous metal that has various features, including high toughness, high rigidity, high magnetic permeability, low coercivity, and high durability. This is because the use of an amorphous metal yields better Barkhausen effect and Matteuci effect than other magnetic materials.

The novel Karman flowmeter of this invention utilizes the variations in pressure caused by a Karman vortex street produced on the downstream side of a column inserted in a fluid to cause a vibrating plate to vibrate in response to the variations in the pressure which forms first and second magnetic circuits whose magnetic flux reverses in direction whenever the direction of the vibration of the vibrating plate portion is reversed whereby the velocity of fluid flow can be determined from the frequency of magnetic flux reversal. Thus, the flowmeter detects the flow rate accurately and the accuracy with which the flow rate is detected deteriorates less with time than the conventional optical detection type flowmeter because the vibration of the vibrating plate is magnetically detected.

The invention claimed is:

1. A Karman vortex flowmeter for producing a Karman vortex street corresponding to the velocity of a fluid on the downstream side of a column inserted in the fluid to produce the vortex street and for measuring the flow rate of the fluid by making use of the variations in the pressure caused by the production of the Karman vortex street, said flowmeter comprising: a metal sheet member consisting of a magnetic substance and containing a vibrating plate portion which vibrates in response to the variations in the pressure, the sheet member having first and second magnetic circuit-forming portions to produce a magnetic circuit whose magnetic flux reverses in direction whenever the direction of the vibration of the vibrating plate portion is reversed; pressure transfer means for transmitting the variations in the pressure in the column to the vibrating plate portion; magnets disposed to magnetize the vibrating plate portion to different polarities according to the direction of the vibration of the vibrating plate portion; and a detecting means for detecting the inversion of the direction of the magnetic flux caused by the formation of the magnetic circuit to determine the flow rate of the fluid.

2. The Karman vortex flowmeter of claim 1, wherein said metal sheet member consists of an amorphous metal sheet having portions that twist during vibration of the vibrating plate portion, and wherein said detecting means has a voltage pulse-detecting means which detects voltage pulses produced from the metal sheet member due to the inversion of the direction of the magnetic flux caused by the inversion of the vibration direction of the vibrating plate portion and also due to the twisting effect on said portions of the metal sheet member that twist during vibration.

3. The Karman vortex flowmeter of claim 1, wherein said detecting means includes a detector coil disposed at a certain position on the metal sheet member forming a portion of said magnetic circuit so that the voltage pulses produced by inversion of the direction of the magnetic flux may be detected by said detector coil.

4. In a Karman vortex flowmeter having a vibrating plate portion that vibrates in relation to the rate of fluid flow the improvement comprising means including said vibrating plate portion forming first and second magnetic circuits for producing a magnetic circuit whose magnetic flux reverses in direction whenever the direction of the vibration of the vibrating plate portion is reversed, and means for detecting the reversal of the direction of the magnetic flux and determining the fluid flow rate from the frequency of magnetic flux reversal.

5. The flowmeter of claim 4, wherein said vibrating plate portion is of a sheet of magnetic material, a pair of magnets are positioned to alternately magnetize the vibrating plate during vibration for producing the reversing magnetic flux in the magnetic circuit.

6. The flowmeter of claim 5, wherein the pair of magnets have opposite magnet poles facing the vibrating plate portion.

7. The flowmeter of claim 5, wherein said vibrating plate portion is a portion of a metal sheet member having portions for supporting the vibrating plate portion for vibration and portions forming the magnetic circuit with the pair of magnets.

8. The flowmeter of claim 7, wherein the vibrating plate portion includes two end portions extending laterally from said supporting portions for allowing the end portions to move in opposite directions during vibration of the vibrating plate portion.

9. The flowmeter of claim 7, wherein the support portions are twisted during vibration and form a portion of the magnetic circuit for enhancing the magnetic flux reversal detection by said twisting.

10. The flowmeter of claim 7, wherein said two end portions of the vibrating plate portion are positioned adjacent said pair of magnets for forming the first and second magnetic circuits.

* * * * *